June 19, 1928.

J. F. SCHRUMM 1,674,451

ELECTRIC POWER DEMAND CONTROL SYSTEM

Filed Jan. 26, 1927        2 Sheets-Sheet 1

INVENTOR
Jewett F. Schrumm
BY
H. G. Manning
ATTORNEY

June 19, 1928.

J. F. SCHRUMM 1,674,451

ELECTRIC POWER DEMAND CONTROL SYSTEM

Filed Jan. 26, 1927   2 Sheets-Sheet 2

INVENTOR
Jewett F. Schrumm
BY
H. G. Manning
ATTORNEY

Patented June 19, 1928.

1,674,451

UNITED STATES PATENT OFFICE.

JEWETT F. SCHRUMM, OF WATERBURY, CONNECTICUT.

ELECTRIC POWER DEMAND CONTROL SYSTEM.

Application filed January 26, 1927. Serial No. 163,646.

This invention relates to electric power regulators, and more particularly to an electrical system for automatically limiting the maximum power demand of an electrical power installation where constant power is not required.

One object of the invention is to provide a power regulator of the above nature adapted to control the power supplied to a plurality of heating elements, said regulator being adapted to hold one of the heating elements out of operation while another element is being operated.

A further object is to provide an electric power controlling device which will produce a more uniform load upon the power line, thereby improving the load factor.

A further object is to provide a device of the above nature which will be simple in construction, inexpensive to manufacture, easy to install and manipulate, compact, and very efficient and durable in use.

With these and other objects in view there has been illustrated on the accompanying drawings one form in which the invention may be conveniently embodied in practice.

Figure 1:
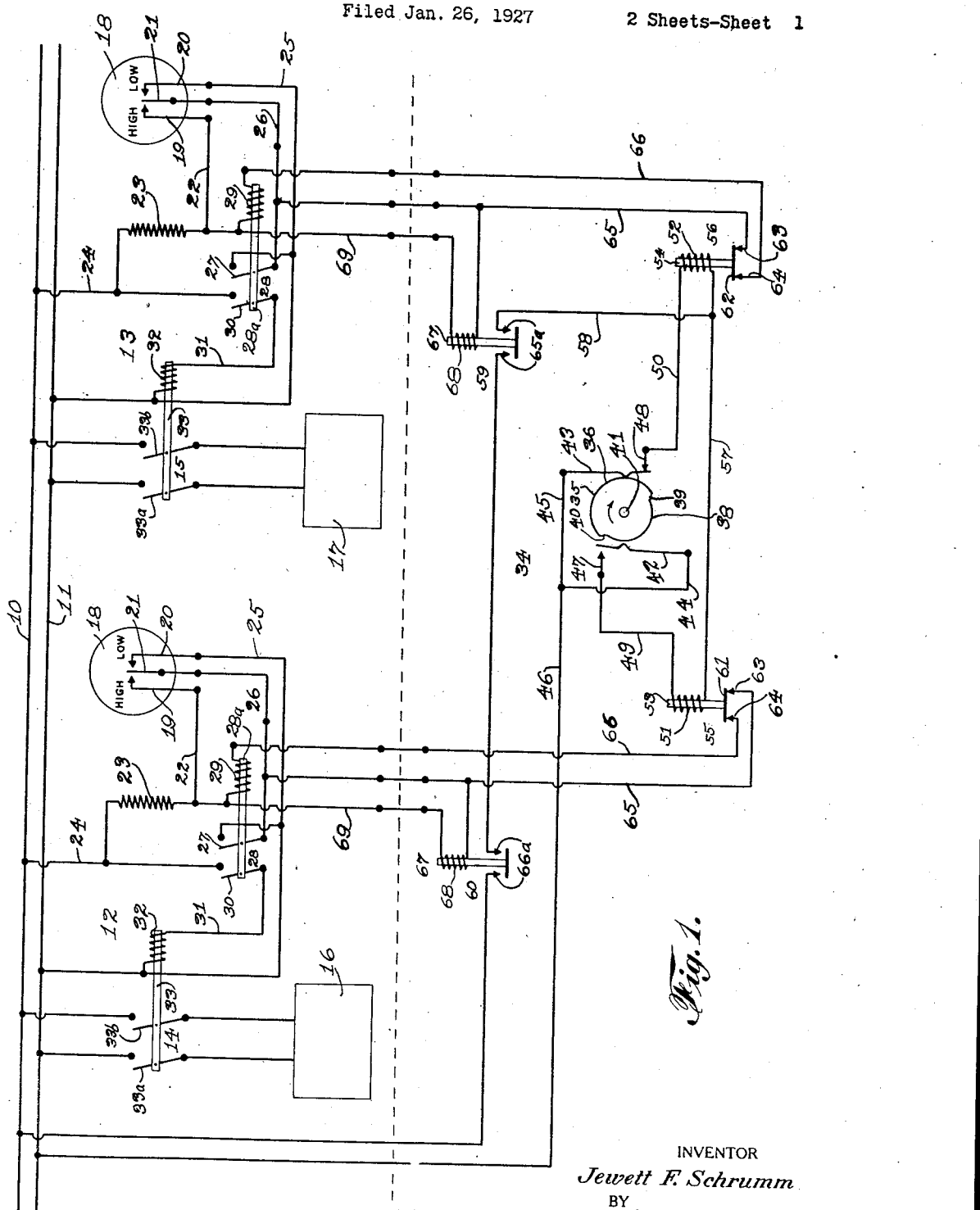
Fig. 1 represents a diagrammatic view of the demand control system as connected for controlling the power supplied to a pair of heating elements of an electric annealing furnace.

In the operation of central power generating stations, the size and capacity of the electrical generators are generally determined by the "peak" load representing the highest amount of power which may be required from the station. It naturally follows that for the most economical operation of such a station, the peak load should be maintained at the minimum.

In view of the above, it is customary for central stations in selling power to individual consumers to charge not only for the actual power consumed, but also to make an additional "demand" charge based upon the station investment value of equipment which must be held ready for the consumer's use. The use of such "demand" charges in addition to the actual power charges has proven extremely valuable in practice as a means of encouraging consumers to stabilize their power consumption and reduce fluctuations therein.

By means of the present invention, a demand control apparatus has been provided which may either be manufactured as an integral unit or as an attachment to a plurality of temperature-controlled power regulators of the type now in general use. The system herein disclosed, by way of example, is arranged to control the energy supplied to a pair of resistance heating units of an electric furnace, in such a manner that power will be taken alternately by said units.

Referring now to the drawings in which like reference numerals denote corresponding parts throughout the several views, the numerals 10 and 11 respectively indicate a pair of supply conductors, whereby energy is supplied from a central power station, not shown. Connected to the supply conductors 10 and 11 are a pair of temperature-regulated control circuits generally indicated by the numerals 12 and 13, said circuits being adapted to be opened and closed by means of a pair of main two-pole magnetic switches 14 and 15. The switches 14 and 15, when closed, are adapted to supply current to a pair of heating elements 16 and 17 which may comprise the front and rear heating units of an electric annealing furnace, not shown. The control circuits 12 and 13 are similar in all respects, so that a description of one of them will be sufficient to explain the operation of both.

The control circuit 13 is provided with a thermostat 18 controlled by a thermo-couple or other temperature responsive instrument, not shown, located within the furnace. The thermostat 18 is provided with stationary contacts 19 and 20 marked with the legends "High" and "Low" respectively, and between said contacts 19 and 20 is an intermediate movable contact 21. The contact 21 is adapted to be moved to the right or left according as the temperature in the furnace becomes too high or too low by means of suitable mechanism, not shown. The "High" contact 19 is connected by a wire 22 to a fixed resistance 23, the latter being connected by a wire 24 to the line conductor 10. The "Low" contact 20, on the other hand, is connected by a wire 25 directly to the line conductor 11. The intermediate movable contact 21 is connected by a wire 26 to one arm 27 of a two-pole relay switch 28, said relay switch 28 being actuated by an armature rod 28ᵃ under the control of a solenoid 29 and a spring, not shown. The other arm 30 of the relay switch 28 is connected by a wire 31 to a solenoid 32, the latter being connected to the supply conductor 11 through the wire 25, previously mentioned. The solenoid 32 surrounds an armature rod 33 which is connected to the arms 33ᵃ and 33ᵇ of the main magnetic switch 15.

By means of this construction, it will be seen that whenever the movable contact 21 is at the "Low" position and the solenoid 29 is energized, the armature rod 28ᵃ will be pulled to the right, as viewed in Fig. 1, closing the relay switch 28 and causing current to flow through the solenoid 32. The armature rod 33 of the main relay switch 15 will thus be pulled to the right, closing the circuit through the heating element 17.

Demand control circuit.

Figure 2:
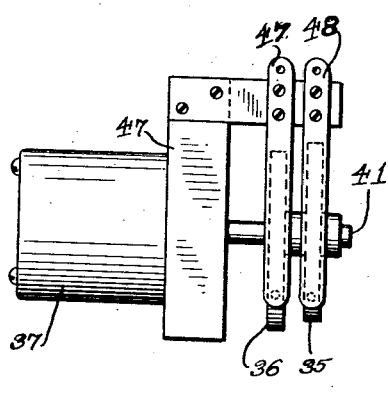
Fig. 2 is a side view of the timer mechanism employed in connection with the electric power regulator.

Associated with the temperature-regulated control circuits 12 and 13 is a demand control circuit, generally designated by the numeral 34, as shown in Fig. 1. This circuit is so arranged that the solenoids 29 of the circuits 12 and 13 will be alternately energized so as to cause current to be alternately thrown into the loads 16 and 17, while the furnace is coming up to the annealing temperature. This has been accomplished by providing a pair of rotary cams 35 and 36 adapted to be continuously rotated by any suitable mechanism, such as a motor 37, as shown in Fig. 2. Each of the cams 35 and 36 is substantially circular in shape and has a reduced section 38 joined to its outer periphery by inclined sections 39 and 40, the reduced section 38 of the cam 35 being positioned at 180 degrees from that of the cam 36. The cams 35 and 36 are mounted on a shaft 41 driven by the motor 37 and are continuously engaged by a pair of time-controlled switches having movable resilient contact arms 42 and 43, which are connected at their fixed ends by wires 44 and 45 to a wire 46 leading to the line conductor 11.

Figure 3:
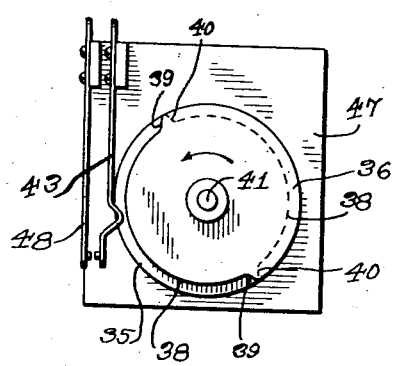
Fig. 3 is an end view of the same.

The time-controlled switches are preferably arranged on the same side of the cams 35 and 36 and mounted on an L-shaped support 47 secured to the motor casing, as shown in Figs. 2 and 3, but on the wiring diagram of Fig. 1 for convenience in illustration said switches have been shown on opposite sides of said cams. The resilient contact arms 42 and 43 are bent to form V-shaped projections for engaging the outer peripheries of the cam members 35 and 36 respectively. The free extremities of said contact arms 42 and 43 are provided with contact points adapted to be forced into engagement with a pair of fixed contact arms 47 and 48 respectively, when the V-shaped projections are riding upon the outer peripheries of said cams. The contact arms 47 and 48 are connected by wires 49 and 50 respectively to a pair of solenoids 51 and 52 surrounding a pair of armatures 53 and 54 of a pair of selecting relay switches 55 and 56. A common wire 57 connects the solenoids 51 and 52, and said common wire is joined to the line conductor 10 by a wire 58 having the contacts of a pair of relay switches 59 and 60 in series therewith. The armatures 53 and 54 carry movable contacts 61 and 62 which are adapted to drop into engagement with the fixed contacts 63 and 64 when the solenoids 51 and 52 are deenergized. The fixed contacts 63 and 64 are connected by wires 65 to the wires 26 of the temperature-controlled circuits 12 and 13, while the fixed contacts 64 are connected by wires 66 to the solenoids 29.

The relay switches 59 and 60 are provided with fixed contact terminals 65ᵃ and 66ᵃ adapted to be connected by movable armatures 67 when the solenoids 68 are energized, and one end of each solenoid 68 is connected by a wire 69 to the resistance 23 leading to the wire 24 and the line 10, while the other end of the solenoid is connected to the wire 65.

In operation, while the furnace is being heated up to its annealing temperature, both of the movable contacts 21 of the thermostats 18 will engage the "Low" contacts 20, and the furnace sections 16 and 17 will be operated alternately on "time cycle" by the demand control circuit 34. Since the reduced sections 38 are oppositely arranged only one of the solenoids 51 and 52 will be energized at one time.

Two conditions may arise—First, with the solenoid 52 deenergized, in which case current will flow from the line conductor 10 through wire 24, resistance 23, taking a divided path through the solenoid 29 and the wire 69. From the wire 69 the current will pass through the solenoid 68, wire 65. wire 26, the movable contact 21, the "Low" contact 20, the wire 25, to the line conductor 11. From the solenoid 29, the current flow will be through the wire 66, fixed contact 64, movable contact 62, joining the other branch of the divided circuit at the wire 65. The switches 28 and 15 will thus be closed causing power to be supplied to the heating unit 17. Under the second condition, namely when the solenoid 52 is energized, the contact 62 will be raised preventing the flow of current through the solenoid 29. The switches 28 and 15 will then remain open and no power will be supplied to the heating unit 17.

Assuming the parts to be in the position shown in Fig. 1, with the movable contacts of both thermostats in the "Low" positions, the circuit will be closed through the resilient contact 43, the fixed contact 48, and the wire 50 energizing the solenoid 52, thereby raising the armature 54 and deenergizing the solenoid 29, which will allow the main switch 15 to open and throw out the right-hand unit 17. At the same time, the circuit through the resilient contact arm 42, the fixed contact 47, the wire 49, and the solenoid 51 will be open, allowing the armature 53 to drop and close the circuit through the solenoid 29 of the left-hand circuit 12. The main magnetic switch 14 will thus be held closed and the furnace unit 16 will be thrown into operation.

When, however, the cam shaft 41 has rotated until the circuit through the resilient contact arm 42, the contact 47, the wire 49, etc., is closed, power will be supplied to open the relay switch 55, thereby cutting out the left-hand unit 16. Immediately thereafter the rotation of the cam shaft 41 will cause the circuit through the resilient contact arm 43, the contact 48, the wire 50, etc. to be opened, thus causing the solenoid 29 of the right-hand control circuit 13 to be energized and the heating unit 17 to be thrown into operation. The cams 35 and 36 are so shaped that there will be no possibility of both units taking power simultaneously.

It will be noticed that when both of the contacts 21 are in the "Low" position and the work is still coming up to heat at both ends of the furnace, both of the relay switches 59 and 60 will remain closed. The selecting switches 55 and 56, however, will open and close alternately in accordance with the period of rotation of the motor 37 of the electric timer mechanism. In one particular installation, a time cycle based on three-minute intervals between alternations of the load was found satisfactory, but it will be understood that any other desired intervals may be employed.

When one of the furnace heating units has come up to the desired temperature, the movable contact 21 of its controlling thermostat 18 will engage the "High" contact 19 and open the circuit through the solenoid 68 of the time cycle relay switch associated therewith. Under these conditions, current will flow from the line conductor 10, through wire 24, resistance 23, wire 22, "High" contact 19, movable contact 21, wire 26, contact 27, wire 25, to the line conductor 11. The solenoids 29 and 68 will thus be short-circuited and deenergized, allowing the switches 28 and 59 to open. This operation will short circuit and deenergize the solenoids 29 and 68 and open the circuit through the common wire 57, thereby disconnecting the power from the heating unit 17 and throwing the system out the time cycle operation. The unit which has not yet come up to the desired temperature will then after a short interval go into operation and will continue to heat the furnace until said unit reaches its cut-out point. At that time, the high contact of its thermostat will close and both units will be thrown out; in other words, there will be a complete cessation of demand until one end of the furnace cools off sufficiently to cause its thermostat contact 21 to move back to the "Low" position. This unit will then operate normally—i. e. under a pure thermostatic control independent of the time cycle circuit—until the other end of the furnace cools off below the "cut-in" position, at which time both units will again be operated by time cycle. The above operations will continue indefinitely so long as power is supplied from the line.

Figure 4:
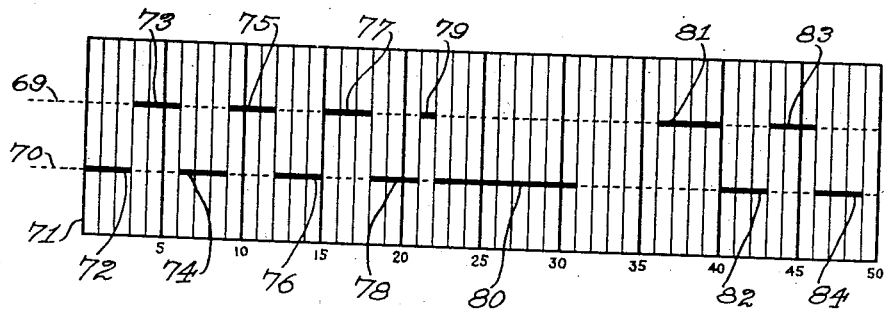
Fig. 4 is a view of a chart illustrating the operation of the demand control system.

In order to more clearly illustrate the operation of a two-unit furnace, upon which the present invention has been installed, the chart shown in Fig. 4 was prepared. This chart is ruled off with parallel vertical lines, the horizontal distance between successive lines representing an interval of one minute. A pair of horizontal dotted lines 69 and 70 are also provided, the upper line 69 denoting the power demand of the heating unit in the rear of the oven and the lower line 70 the power demand of the front heating unit. Beginning at the left-hand edge 71 of the chart, it will be seen that the load will be thrown alternately on the front and rear heating units for three minute periods, these periods being represented by the short heavy lines 72, 73, 74, 75, 76, 77, and 78. The heavy line 79, however, extends only between two of the vertical lines and indicates that after the rear unit had been operating for one minute of its cycle, the rear end of the furnace reached the desired temperature and was instantly cut out. At this same instant, as indicated by the relatively long heavy line 80, the front unit, which has not yet come up to the required temperature, was automatically thrown into operation and continued to heat the front of the furnace continuously, independent of the time cycle control circuit, for a period of nine minutes, in this instance before it was cut out. The chart indicates that both of the heating units then remained idle for a period of five minutes until the rear part of the furnace had cooled off to the "cut-in" temperature. The rear unit then went into operation and remained in during a period of four minutes, as indicated by the heavy line 81, at which time the front unit had also cooled down to the cut-in temperature. The furnace then went back into time cycle control, as indicated by the heavy lines 82, 83, and 84.

When the present invention is employed for heating a metal charge in an electric furnace, it will be found that the heat will flow into the work more efficiently than when the heat is supplied constantly from an unchanging heating element. This is for the reason that the heat is alternately supplied at opposite ends of the charge causing convection currents to be set up and a greater rate of heat exchange will occur. The heated gases will thus surge back and forth over the work and their heating effect will be added to the heat radiated directly from the heating elements resulting in a greater total heat exchange.

This method of alternate heat supply tends to keep the temperature of the furnace nearer the temperature of the work. In other words, heat is supplied no faster than the work can absorb it so that when it is removed from the furnace, the outer layers are only slightly hotter than the centre. This results in a saving of power by preventing heat being put into the metal unnecessarily.

While the invention as is herein disclosed is applied to limiting the demand of a pair of heating elements of an annealing furnace, it will be understood that it is not limited to such use, but may be employed equally well for limiting the demand of a pair of such furnaces, or pairs of any other power-consuming devices where a continuous supply of power to such devices is not essential. Among such other devices may be mentioned compressors, refrigerators, ovens, melting furnaces, and carbonizing furnaces, etc.

It will also be understood that the invention is not to be limited to the control of current supplied to a pair of units, but may also be employed in modified forms to control any number of power-consuming units.

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claims.

Having thus fully described the invention, what is claimed as new and for which it is desired to secure Letters Patent, is:

1. In an electric control system, a plurality of electric power-consuming units, temperature-controlled means for automatically regulating the power supplied to each of said units independently, and means for preventing more than one of said units from taking power at the same time, whereby the maximum demand will be limited.

2. In an electric heat control system, a plurality of electric power-consuming units, temperature-controlled means for automatically regulating the power supplied to each of said units independently, and means for preventing more than a certain number of said units from taking power at the same time, whereby the maximum demand will be limited.

3. In an electric control system, a pair of electric power-consuming units, temperature-controlled means for independently controlling each of said units, means for preventing the operation of more than one of said units at the same time, and means for alternately supplying power to said units, whereby the maximum demand will be limited.

4. In an electric control system, a pair of electric power-consuming units, temperature-controlled means for independently controlling each of said units, means for preventing the operation of more than one of said units at the same time, and time-controlled means for alternately supplying power to said units, whereby the maximum demand will be limited.

5. In an electric control system, a pair of electric power-consuming units, temperature-controlled means for independently controlling each of said units, means for preventing the operation of more than one of said units at the same time, and mechanically-operated means for alternately supplying power to said units, whereby the maximum demand will be limited.

6. In an electric control system, a pair of electric power-consuming units, temperature-controlled means for independently controlling each of said units, means for preventing the operation of more than one of said units at the same time, and means for alternately supplying power to said units, whereby the maximum demand will be limited, said last named means being rendered ineffective when either of said units has produced a predetermined heating effect.

7. In an electric control system, a plurality of electric power-consuming devices, temperature-controlled electrically-operated means for independently regulating the power supply to each of said power-consuming devices, time-controlled mechanism for alternately supplying power to said devices, means to prevent more than one of said devices from taking power at the same time, and means for rendering said time-controlled means ineffective when any one of said devices has produced a predetermined heating effect.

8. In an electric control system, a plurality of electric power-consuming devices, temperature-controlled electrically-operated means for independently regulating the power-supply to each of said power-consuming devices, time-controlled mechanism for alternately supplying power to said devices, means to prevent more than a certain number of said devices from taking power at the same time, and means for rendering said time-controlled means ineffective when any one of said devices has produced a predetermined heating effect.

9. The combination with a pair of resistance heating units, a pair of temperature-controlled circuits for independently controlling said units, a time-controlled circuit connected with said temperature-controlled circuits for alternately supplying power to said units, relay-controlled switches in said time-controlled circuit adapted to open and render said time-controlled circuit inactive when the portion of the furnace controlled by one of said units reaches a predetermined cut-out temperature, and means for preventing more than one of said units from taking power at the same time.

10. In a control system, a plurality of electric heating units connected with a source of current supply, electro-magnetic switches for throwing in and cutting out said units, and time-controlled mechanism for alternately operating said switches and preventing more than one of said heating units from taking power at the same time.

11. In a control system, a plurality of electric heating units connected with a source of current supply, electro-magnetic switches for throwing in and cutting out said units, relay-controlled circuits for independently actuating said switches, a time-controlled circuit connected with the source of current supply for alternately energizing said relay-controlled circuits, and relay-controlled switches for opening said time-controlled circuit when one of said units has produced a predetermined heating effect.

12. In an electric control system, a pair of electric power-consuming units, temperature-controlled means for independently controlling each of said units, means for preventing the operation of more than one of said units at the same time, and cam-operated time-controlled means for alternately supplying power to said units whereby the maximum demand will be limited.

13. In an electric control system, a pair of electric power-consuming units, temperature-controlled means for independently controlling each of said units, means for preventing the operation of more than one of said units at the same time, and cam-operated means for alternately supplying power to said units whereby the maximum demand will be limited.

14. In an electric control system, a plurality of electric power-consuming units, means controlled by the operation of said units for automatically regulating the power supplied to each of said units independently, and means for preventing more than one of said units from taking power at the same time, whereby the maximum demand will be limited.

15. In an electric control system, a plurality of electric power-consuming units, means controlled by the operation of said units for automatically regulating the power supplied to each of said units independently, and means for preventing more than a certain number of said units from taking power at the same time, whereby the maximum demand will be limited.

16. In an electric control system, a pair of electric power-consuming units, means controlled by the operation of said units for independently controlling each of said units, means for preventing the operation of more than one of said units at the same time, and means for alternately supplying power to said units, whereby the maximum demand will be limited.

17. In an electric control system, a pair of electric power-consuming units, means controlled by the operation of said units for independently controlling each of said units, means for preventing the operation of more than one of said units at the same time, and time-controlled means for alternately supplying power to said units, whereby the maximum demand will be limited.

18. The process of limiting the maximum demand from a plurality of electric power consuming units which consists in automatically regulating the power supplied to each of said units independently and automatically preventing more than one of said units from taking power at the same time.

In testimony whereof, I have affixed my signature to this specification.

JEWETT F. SCHRUMM.